E. S. HOPSON.
CONTAINER STOPPER.
APPLICATION FILED FEB. 21, 1913.
1,083,327.
Patented Jan. 6, 1914.
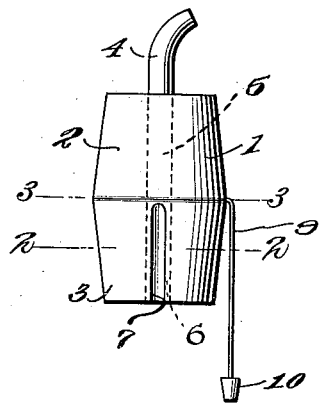
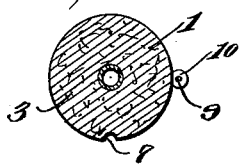
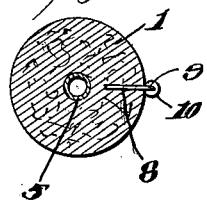
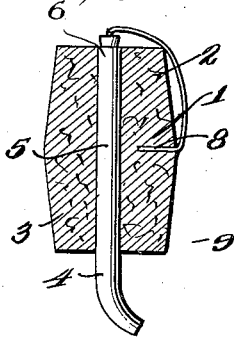
WITNESSES:
INVENTOR
Edwin S. Hopson,
BY
his ATTORNEY

UNITED STATES PATENT OFFICE.

EDWIN S. HOPSON, OF RUSSELLVILLE, KENTUCKY.

CONTAINER-STOPPER.

1,083,327.  Specification of Letters Patent.  Patented Jan. 6, 1914.

Application filed February 21, 1913. Serial No. 749,917.

*To all whom it may concern:*

Be it known that I, EDWIN S. HOPSON, a citizen of the United States, residing at Russellville, in the county of Logan and State of Kentucky, have invented certain new and useful Improvements in Container-Stoppers, of which the following is a specification.

This invention relates to container stoppers, and the primary object thereof is the provision of a container stopper, which will facilitate the dispensing of the liquid contained in the container, especially in instances where the vessel into which the liquid is being poured has a small opening.

There are many instances when the liquid contained in a container, such as a bottle, jug or the like, is poured therefrom into a vessel of smaller size or one which has a small mouth, such as the pouring of ink into ink-wells, the filling of lamps, or the like, is, with the ordinary type of bottle or jug, an exceedingly tedious operation. It is especially so if it is desired not to waste the liquid. A funnel is, in ordinary practice, most commonly used, but it is an object of this invention to produce a container stopper which will eliminate the use of all accessory utensils and which will insure the dispensing of the liquid without waste.

Another object of the invention is to construct a container stopper of this nature in such manner that when it is desired not to dispense of liquid, the stopper may be reversed, thereby forming an air-tight closure for the container and preventing evaporation of the liquid caused by atmospheric circulation.

A still further object of this invention is to construct a stopper of this nature in as simple a manner as is consistent with the performing of its functions, thereby reducing the cost of production to a minimum.

With the above and other objects in view, this invention consists in such novel features of construction, combination, and arrangement of parts as will be hereinafter more fully set forth and illustrated in the accompanying drawings and claimed.

In describing the invention in detail, reference will be had to the accompanying drawings wherein like characters designate like or corresponding parts throughout the several views and in which, Figure 1 is an elevation view of the improved stopper; Fig. 2 is a sectional view taken on the line 2—2 of Fig. 1; Fig. 3 is a cross-sectional view taken on the line 3—3 of Fig. 1; and, Fig. 4 is a centrally vertical sectional view through the stopper.

In referring to the drawings by numeral, 1 designates the stopper, which may be constructed of cork, rubber, or any desirable material and which has two sections oppositely disposed and identical in construction. These two sections 2 and 3 are constructed identically and oppositely disposed, having their enlarged ends connected in order that the stopper 1 may be reversed in the opening of the container and either form an air-tight closure for the container or a means such as is set forth in the objects for dispensing the liquid.

Centrally mounted within the stopper 1 and having the end 4 protruding therefrom is a tubular member 5. The protruding end 4 of the member 5 is slightly curved as is shown at 6. The tubular member 5 forms an outlet for the liquid which is contained within the container.

The section 3 of the stopper 1 has a small longitudinally extending cut-out portion 7 in the outer surface thereof. This cut-out portion 7 forms an air vent whereby when the liquid is being dispensed, air circulation is permitted within the container. Inserted in the stopper 1 at the line of connection of the two sections 2 and 3 is the end 8 of a flexible member 9 which has a smaller or auxiliary stopper 10 secured to its outer end. When the stopper is inserted in the opening of a container in a manner to form an air-tight closure therefor, the auxiliary stopper 10 is inserted in the opening in the end 6 of the tubular member 5 and the stopper is inserted in the opening of the bottle in the position as is shown in Fig. 4 of the drawings. The stopper 1 being inserted in the position heretofore described or having the section 2 inserted within the opening in the container will close all openings between the interior of the container and the atmosphere because of the fact that the cut-out portion 7 will then be out of the opening or mouth of the container and the auxiliary stopper 10 will close the opening of the tubular member 4.

For the dispensing of the liquid, the section 3 of the stopper is inserted in the opening or mouth of the container in such a manner that the small or upper end of the longitudinally extending cut-out portion 7 will protrude above the container mouth thereby allowing the admission of air into the interior of the container. The liquid is dispensed through the tubular member 5 and as this member is smaller in diameter than is the mouth or opening of the container, the liquid may be poured from the container into a vessel having a much smaller mouth or opening or into a smaller vessel, without spilling or wasting of the liquid.

In practical fields, certain minor features of construction, combination and arrangement of parts may necessitate alterations to which the patentee is entitled, provided such alterations are within the scope of the appended claim.

What is claimed is—

In a container stopper, the combination of, a body portion constructed of two sections frusto conical shaped whereby the stopper is reversible, a tubular member centrally located and extending longitudinally through said body portion, a cut-out portion forming an air-vent in the outer surface of one of said sections, a flexible member having one end mounted in said body portion, and an auxiliary stopper connected to the outer end of said flexible member.

In testimony whereof I affix my signature in presence of two witnesses.

EDWIN S. HOPSON.

Witnesses:
C. H. CALDWELL,
CA WILSON.

Copies of this patent may be obtained for five cents each, by addressing the "Commissioner of Patents, Washington, D. C."